United States Patent [19]
Goel et al.

[11] Patent Number: 6,111,945
[45] Date of Patent: Aug. 29, 2000

[54] VIRTUAL INTER-MACHINE TRUNKING FEATURE FOR COMMUNICATION NETWORKS

[75] Inventors: Anurag Goel, Tinton Falls, N.J.; Joan M. Sliwa, Carol Stream, Ill.

[73] Assignee: AT&T Corp., New York, N.Y.

[21] Appl. No.: 09/042,052

[22] Filed: Mar. 13, 1998

[51] Int. Cl.[7] .................................................. H04M 7/00
[52] U.S. Cl. ........................ 379/220; 379/230; 379/207
[58] Field of Search ................................. 379/219, 220, 379/221, 229, 230, 211, 212, 297

[56] References Cited

U.S. PATENT DOCUMENTS

| | | | |
|---|---|---|---|
| 4,555,594 | 11/1985 | Friedes et al. ............................ | 379/220 |
| 4,565,903 | 1/1986 | Riley ......................................... | 379/220 |
| 4,577,066 | 3/1986 | Bimonte et al. .......................... | 379/221 |
| 5,661,792 | 8/1997 | Akinpely et al. ..................... | 379/220 X |
| 5,949,867 | 9/1999 | Sonnenberg .......................... | 379/220 X |
| 5,995,613 | 11/1999 | Goel et al. ............................ | 379/220 X |

OTHER PUBLICATIONS

*AT&T Business Communication Services Guide*, 1995, pp. 4–1 through 4–93 and 5–1 through 5–7.

*Primary Examiner*—Creighton Smith

[57] ABSTRACT

A method and apparatus are disclosed for routing calls from a communication carrier network to a customer. According to the method, setup signaling including a destination telephone number is received from the carrier network representative of a desired call connection. The destination telephone number and a carrier identifier are referred to a memory and a profile of the carrier network is retrieved therefrom. A routing identifier is retrieved from the profile based on the telephone number. Based upon the routing identifier, the call is routed to its destination.

13 Claims, 3 Drawing Sheets

PRIOR ART
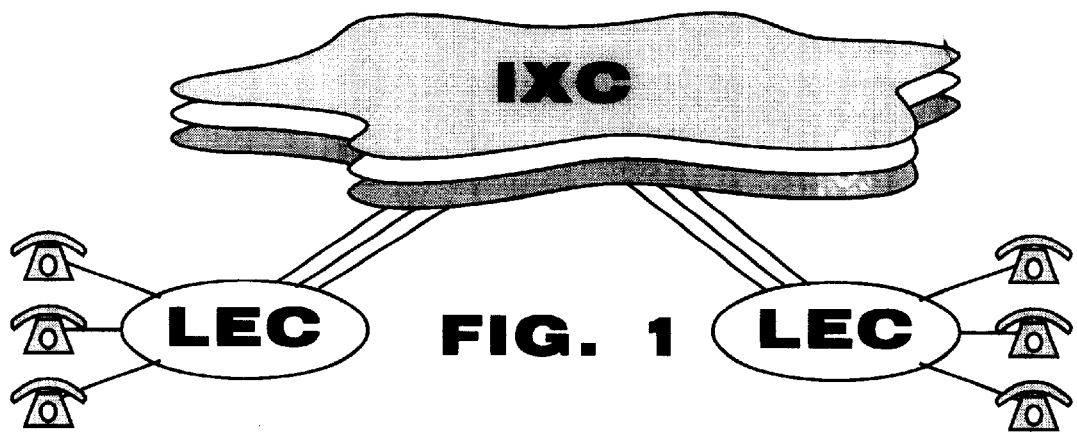
FIG. 1
FIG. 2
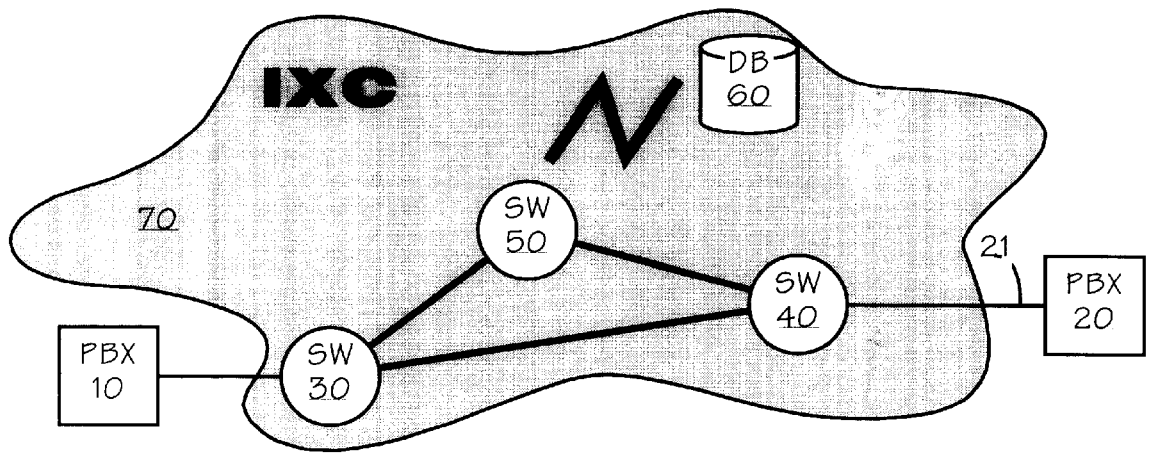
PRIOR ART

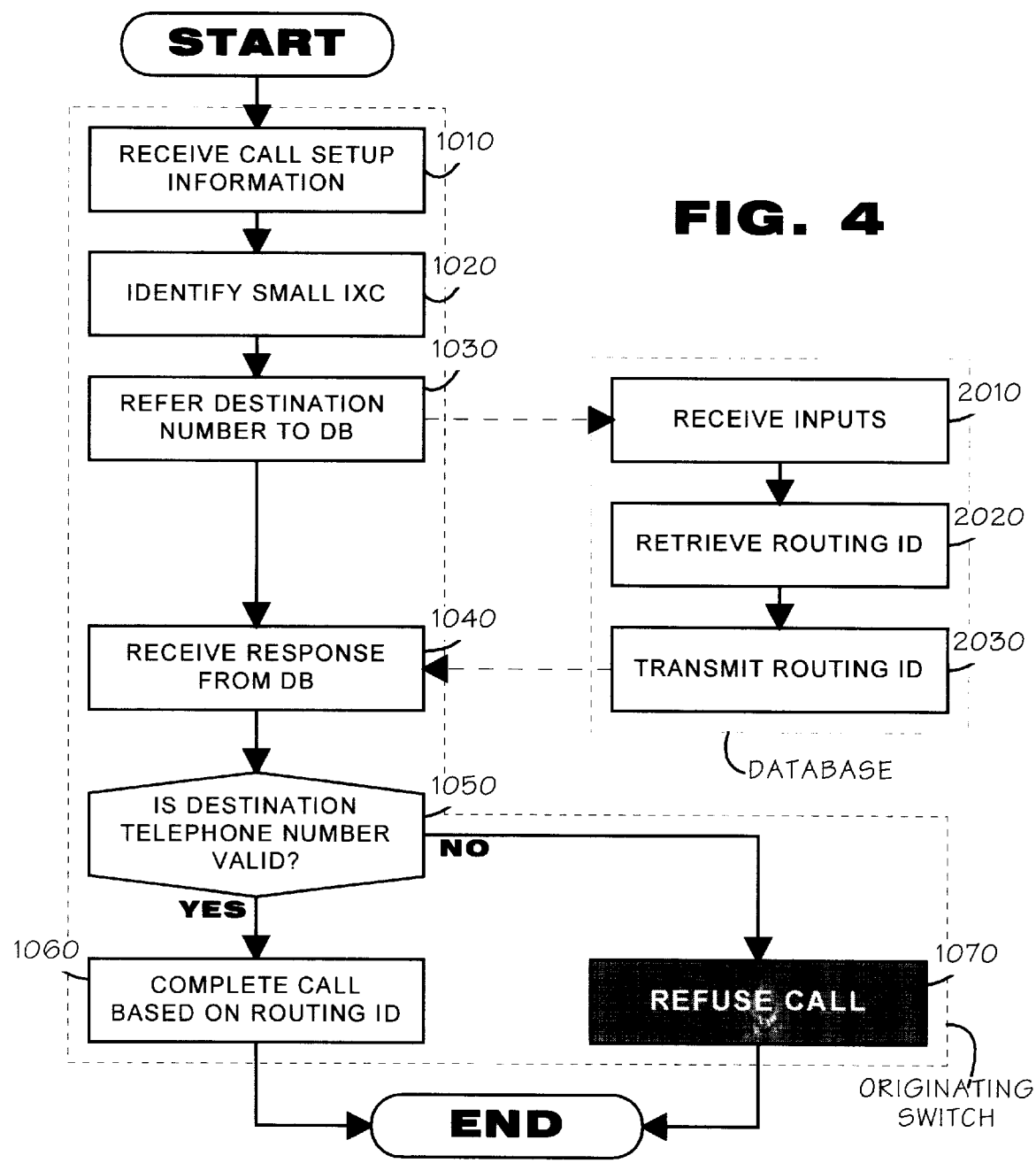

VIRTUAL INTER-MACHINE TRUNKING FEATURE FOR COMMUNICATION NETWORKS

BACKGROUND OF THE INVENTION

1. Field of the Invention

The present invention relates to a method and apparatus of interconnecting two interexchange carriers ("IXCs") in a manner that: 1) allows a first IXC to provide service to its customers via a second IXC, and 2) maintains proprietary network data, network security and network reliability for the second IXC.

2. Related Art

As is known, the Public Switched Telephone Network ("PSTN") is populated by a plurality of communication networks. A simplified model of the PSTN is shown in FIG. 1. Local Exchange Carriers ("LECs") traditionally provide regional communication services to telephone subscribers. Telephones of customers within the LEC's operating area connect directly the LEC's communication equipment. IXCs route calls from one LEC to another. In practice, there are several IXCs that provide long-distance carrier services. Under a traditional model, each IXC provides a physical connection from its network to each LEC that it services. A customer may designate one of the IXCs as a carrier of choice, in which case the LEC routes calls for that customer to the designated IXC.

Tolls for long distance calls typically are shared among three communication networks: The LEC serving the calling customer, the IXC and the LEC serving the called customer. To reduce costs of call connections, certain customers connect their communication equipment directly to an IXC. Typically, such customers are commercial customers possessing high capacity communication equipment, such as a private branch exchange ("PBX"), that may be configured to connect directly to the IXC's communication equipment. Because these large customers provide their own access to an IXC as an alternative to a LEC, they are referred to as "alternative access customers."

Not all IXCs are created equal. Some small IXCs possess one or a few communication switches to carry communication traffic. Other, larger IXCs possess multiple communication switches. To conform to the traditional model of FIG. 1, an IXC would provide a physical connection to each LEC that it serves. The IXC would do so by providing a separate optical or electrical cable, such as a T1 trunk, to carry communication traffic between it and the LEC. T1 trunks have sufficient capacity to carry up to 23 simultaneous telephone calls, although higher capacity trunks are known.

Small IXCs may deviate from the traditional model of FIG. 1. Installation and maintenance of physical connections can be prohibitively expensive. The cost of such connections increases based upon the distance that separates the small IXC and the LEC. Further, even when a small IXC installs such a connection, its capacity is limited. When the connection's capacity is exhausted, the small IXC cannot receive additional call traffic from that LEC even though it possesses sufficient capacity to process additional call traffic internally. As a result of the cost and capacity constraints, many small IXCs become geographically concentrated; they do not provide nationwide network coverage. Accordingly, small IXCs typically seek other solutions when serving customers geographically remote from their network. In one proposed solution, a small IXC routes calls to its customers via another, larger IXC.

The geographic concentration of the small IXC adversely affects its ability to provide cost savings to alternative access customers. The customer derives cost savings when the cost of a direct IXC connection is less than the traditional model. As with other physical connections, the cost of a connection to an alternative access customer is related to the physical distance separating the alternative access customer from the small IXC. The greater the distance, the greater the cost. Thus, the geographic concentration of the small IXC can impair its ability to provide alternative access service to geographically distant customers.

The geographic concentration of a small IXC could be overcome by routing traffic to an alternative access customer over a larger IXC, one geographically proximate to the alternative access customer. In this solution, the alternative access customer would connect to the large IXC rather than the small IXC. The small IXC would direct calls to the alternative access customer over the large IXC. However, permitting a small IXC to direct calls over the large IXC raises a host of security concerns with respect to the large IXC.

As is known, a larger IXC typically is populated by a multiple number of network switches. The switches are interconnected by inter-machine trunks. The inter-machine trunks may be optical or electrical trunks which may possess T1 capacity or more. Inter-machine trunks allow the switches to communicate with one another and send customer specific call routing information within the IXC network. Traditionally, inter-machine trunks are kept within an IXC network and are not extended outside the IXC network. Opening the inter-machine trunk to other external networks would expose the IXC network to externally supplied network addressing and call routing information that may be corrupt. This potentially leads to network performance and security degradation. Many IXCs do not have firewalls as part of their inter-machine design to prevent corrupt information from entering the IXC network. Further, the IXC likely uses proprietary network data which would have to be revealed to extend its inter-machine trunk capability to another network. In many large IXCs, such as the network owned and operated by AT&T, loss of reliability or security is intolerable. These risks would cause a large IXC to deny inter-machine trunking capability to a smaller IXC.

No known inter-network interface protocol provides a small IXC with an opportunity to route call traffic to an alternative access customer via a large IXC. Accordingly, there is need in the art for such an interface protocol. Further, there is a need in the art for such a protocol that maintains security and reliability of the large IXC's inter-machine trunks.

Some communication providers currently offer a communication service known as a Virtual Private Network ("VPN"). The service allows a customer to use the provider's network as a private network configured according to parameters established by the customer. For example, the VPN service may place call connections based on private numbering codes, such as intercom codes, established by the customer. Such a service generates an appearance that the customer is connected by a private network even though the provider's network handles the calls.

FIG. 2 illustrates a typical implementation of a VPN. A PBX 10, 20 from each office connects to the closest switch 30, 40 of a communication service provider 70 over a unique physical interface. To implement the private numbering plan feature of the VPN service, a caller dials a custom private code requesting a called party. The PBX 10 interfaces with the IXC's switch 30 and sends the pre-defined code to the switch. The switch 30, based on the customer's unique PBX to switch interface, recognizes this call as a VPN call and queries a database 60. The database 60 stores unique customer profiles for each customer to the VPN service. Based on the switch query, the database retrieves a profile of the VPN customer that contains a network address to be used by the switch 30 to complete the call.

Armed with the network address, the switch 30 establishes a call connection to a second switch 40 connected to the PBX 20 of the called party. The network address identifies the trunk 21 interconnecting the PBX 20 to the second switch 40. The first switch 30 also provides information to the called party's PBX 20 allowing the PBX 20 to route the call further to the called party.

The VPN service provides no means for a first IXC to originate and terminate its nodal customers' calls via a second IXC. In other words, the VPN service does not allow for inter-machine trunking capability.

SUMMARY OF THE INVENTION

According to the present invention, a virtual inter-machine trunking facility is established between a first IXC and a customer to which it is not directly connected by a second IXC. For a given call, the first IXC requests the second IXC to establish a connection to the customer. The protocol exchanged between the first and second IXCs, however, prevents requests from the first IXC from jeopardizing the security and reliability of the second IXC.

According to the protocol, setup signaling including a destination telephone number is received from the first IXC representative of a desired call connection. The destination telephone number and a carrier identifier are referred to a memory within the second IXC and a profile of the first IXC is retrieved therefrom. A routing identifier is retrieved from the profile based on the telephone number. Based upon the routing identifier, IXC routes the call to its destination.

BRIEF DESCRIPTION OF THE DRAWINGS

FIG. 1 illustrates a simplified model of the known public switched telephone network.

FIG. 2 illustrates a model of a communication network operating in accordance with the known virtual private network service.

FIG. 4 illustrates a method of operation of an originating switch and a database in accordance with an embodiment of the present invention.

DETAILED DESCRIPTION

Figure 3:
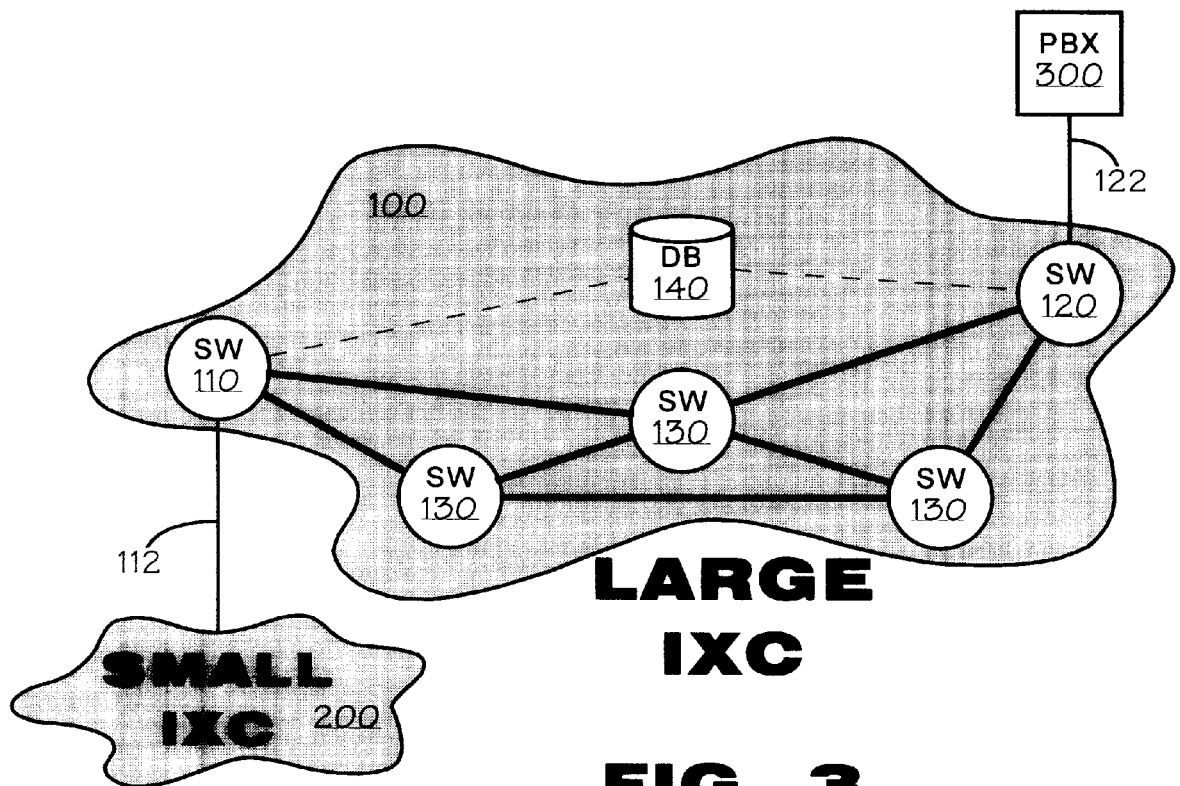
FIG. 3 is a block diagram of a communication network operating in accordance with an embodiment of the present invention.

The present invention provides a virtual inter-machine trunking facility between a small IXC and a customer to which it is not directly connected. Instead, a large IXC connects the small IXC to the customer. For a given call, the small IXC requests the large IXC to establish a connection to the customer. The protocol exchanged between the large and small IXCs, however, prevents requests from the small IXC from jeopardizing the security and reliability of the large IXC's network.

FIG. 3 shows communication networks operating in accordance with an embodiment of the present invention. A first IXC 100 routes calls from a second IXC 200 to the second IXC's customer at PBX 300. For illustrative purposes herein, the first IXC 100 shall be referred to as a "large IXC" and the second IXC 200 shall be referred to as a "small IXC." However, as shall be understood, the principles of the present invention apply without regard to relative sizes among communication networks.

The large IXC 100 is populated by an originating switch 110, a terminating switch 120 and, optionally, a plurality of intermediate communication switches 130 that route call traffic throughout the large IXC. The originating switch 110, the terminating switch 120 and the intermediate switches 130 may be model 4ESS switches, commercially available from Lucent Technologies of Murray Hill, N.J. The large IXC 100 also is provided with a memory such as database 140 described below.

The small IXC 200 is provided in communication with the originating switch 110. The originating switch 100 and the small IXC 200 typically communicate over an optical or electrical cable, such as a T1 trunk 112. The trunk 112 interconnects to the originating switch 110 at one of several physical ports (not shown). A PBX 300 of an alternative access customer connects directly to a terminating switch 120 in the large IXC again over an optical or electrical cable 122.

According to the present invention, the large IXC 100 routes calls from the small IXC 200 to the small IXC's customers. It routes the calls in a way that denies the small IXC 200 access to sensitive interconnection functions employed by the large IXC 100 Thus, the large IXC 100. maintains its own integrity and reliability regardless of the commands that may be input to it by the small IXC 200.

To provide the inter-machine trunking service to a small IXC 200, the small IXC 200 pre-registers with the large IXC 100. As part of the pre-registration, a series of data records are stored in the database 140 identifying destination addresses of the small IXC's customers (such as PBX 300). Each record is indexed by an identifier of the small IXC. Individual customer records are indexed also by the destination number of the corresponding customer. Each record contains a routing identifier identifying an address to which the large IXC 100 will route calls received from the small IXC to the customers. The routing identifier simply may be the same destination number that is used to index the record. The routing identifier identifies a trunk to be used to route calls to the customer (such as trunk 122).

FIG. 4 illustrates a method of operation that the originating switch 110 and database 140 may use to provide inter-machine trunking services to the small IXC 200. During call setup, the small IXC 200 provides the originating switch 110 with call setup information according to conventional techniques (Step 1010). The call setup information includes a destination telephone number representing the PBX 300. The destination telephone number may take several formats, for example, the well known North American Numbering Plan format. Alternatively, the destination telephone number may be a private number generated according to a private numbering plan predefined for both the large and small IXCs. The originating switch 110 identifies the source of the call setup information (Step 1020); typically, the switch 110 may identify the small IXC 200 by the physical port over which it receives the information. The originating switch 110 refers an IXC identifier and the destination number to the database 140 (Step 1030).

The database 140 receives the IXC identifier and the destination number as inputs (Step 2010). It retrieves a routing identifier indexed by these inputs and returns the routing identifier to the originating switch 110 (Steps 2020 and 2030). If the received destination number does not index a record, the database 140 returns a signal indicating that the destination number is invalid (Step not shown).

The originating switch 110 receives the response from the database 140 (Step 1040). The response identifies whether the destination telephone number is valid (Step 1050). If the destination telephone number is valid, the originating switch 110 routes the call based on the routing identifier retrieved from the database 140 (Step 1060). If the destination telephone number is invalid, the originating switch 110 refuses the call (Step 1070).

Thus, according to the present invention, the large IXC 100 routes calls received from the small IXC 200 based on a routing identifier retrieved from a database 140. Although the routing identifier may contain the same destination number received from the small IXC 200, the present invention provides an important protection. The switches of the large IXC 100 are not responsive to commands received from the small IXC 200. They remain immune to errors introduced by the small IXC 200. Although the inter-machine trunking feature provided by the present invention introduces additional steps to complete calls, the cost of the additional steps adds significant protection to the operation of the large IXC 100.

The protocol of the present invention provides important protections to the security and reliability of the large IXC 300. A connection requested by the small IXC 200 will not be implemented by the large IXC 300 unless it "maps" to an entry in the database 140. Therefore, spurious commands imposed by the small IXC 200 will not be implemented by switch 110. The present invention maintains the reliability and security of the large IXC 300.

The present invention also permits a small IXC 200 to establish a private numbering plan for its customers. A private number entered by the customer (not shown) from within the small IXC 200 is presented to the large IXC 100 and referred to the database 140. Provided that the database 140 defines a command with the private number, the large IXC 200 will establish a connection with the large customer 300.

The present invention has been described as implemented in an IXC, namely the large IXC. However, the principles of the present invention may be provided as a feature of any communication carrier, including a LEC, without modification. Further, although the invention has been described as providing inter-machine trunking services for the benefit of small IXCs, it may be provided for the benefit of any communication network, not only IXCs. For example, the present invention may be provided to route traffic of a LEC to an alternative access customer.

We claim:

1. A method of routing calls from a communication carrier network to a customer, comprising steps of:

receiving setup signaling from the carrier network representative of a call connection, said signaling indicating a destination telephone number, referring the destination telephone number and a carrier identifier to a memory, retrieving a profile of the carrier network based on the carrier identifier, retrieving a routing identifier from the profile based on the telephone number, and routing the call based on the routing identifier.

2. The method of claim 1, wherein the routing identifier is the destination telephone number.

3. The method of claim 1, wherein the routing number is a trunk identifier.

4. The method of claim 1, wherein the memory is a database.

5. The method of claim 1, wherein the receiving step is performed at a point of interface switch in communication with the carrier network.

6. In a first communication network, a method of routing calls from a second communication network to a customer of the second network, the customer being connected to the first network by a dedicated connection, comprising steps of:

receiving call setup information from the second network, including a number identifying the customer, identifying the second network, retrieving a profile from a memory based on the identity of the second network, retrieving a routing identifier based on the customer number, and routing the call to the customer based on the routing identifier.

7. The method of claim 6, wherein the routing identifier is the customer number.

8. The method of claim 6, wherein the routing number is a trunk identifier.

9. The method of claim 6, wherein the memory is a database.

10. A communication network providing a virtual private network for a second network, comprising:

an originating switch provided in communication with the second network, a destination switch connected to a customer of the second network, and a network database in communication with the originating switch, the database storing a profile of the second network that associates a destination number of the customer with a routing identifier, wherein, for a new call to be routed to the customer from the second network:

the originating switch receives call setup information identifying the destination number of the customer, the originating switch refers an identifier of the second network and the destination number to the database, the database returns the routing identifier to the originating switch based on the network identifier and the destination number, and the originating switch routes the call to the destination switch based on the routing identifier.

11. The system of claim 10, wherein the routing identifier is the destination number.

12. The system of claim 10 wherein the routing identifier is a trunk identifier.

13. The system of claim 10, wherein the first network is an interexchange carrier.

\* \* \* \* \*